United States Patent
Busch et al.

(10) Patent No.: US 8,740,606 B2
(45) Date of Patent: Jun. 3, 2014

(54) PRESS DEVICE FOR THE ENERGY-EFFICIENT CURING OF A SANDWICH COMPONENT FOR AIRCRAFT

(75) Inventors: Heinz-Peter Busch, Weyhe (DE); Stephan Bonk, Bremen (DE)

(73) Assignee: Airbus Operations GmbH (DE)

( * ) Notice: Subject to any disclaimer, the term of this patent is extended or adjusted under 35 U.S.C. 154(b) by 838 days.

(21) Appl. No.: 11/990,899

(22) PCT Filed: Aug. 23, 2006

(86) PCT No.: PCT/EP2006/008288
§ 371 (c)(1),
(2), (4) Date: Nov. 17, 2008

(87) PCT Pub. No.: WO2007/022970
PCT Pub. Date: Mar. 1, 2007

(65) Prior Publication Data
US 2009/0155403 A1  Jun. 18, 2009

(30) Foreign Application Priority Data

Aug. 23, 2005 (DE) .................. 10 2005 039 844
Jul. 7, 2006 (DE) .................. 10 2006 031 435

(51) Int. Cl.
*B29C 35/04* (2006.01)
*B29C 43/52* (2006.01)

(52) U.S. Cl.
USPC .............. 425/405.1; 425/129.1; 425/327; 425/387.1; 425/508

(58) Field of Classification Search
USPC ......... 425/234, 500, 506, 507, 508, 520, 521, 425/111, 112, 116, 117, 121, 125, 143, 233, 425/501, 503, 517, 128, 129.1, 325, 327, 425/384, 387.1, 394, 405.1, 405.2, 407, 425/412, 419, 420, DIG. 19, DIG. 26, 144, 425/149
See application file for complete search history.

(56) References Cited

U.S. PATENT DOCUMENTS 1,493,925 A * 5/1924 Du Charme .................. 99/381
2,288,899 A * 7/1942 Gits ............................. 156/51

(Continued)

FOREIGN PATENT DOCUMENTS

DE  199 07 279 A1  8/2000
DE  602 00 116 T2  10/2004

(Continued)

OTHER PUBLICATIONS

Database WPI Week 198015, DerwentPublications Ltd., London, GB: AN 1980-26328C XP00240810 & JP 55 028813 A (Kawanuishi Kogyo KK) Feb. 29, 1980.

(Continued)

*Primary Examiner* — Seyed Masoud Malekzadeh
(74) *Attorney, Agent, or Firm* — Lerner, David, Littenberg, Krumholz & Mentlik, LLP

(57) ABSTRACT

A press device for the energy-efficient curing of a sandwich component for an aircraft, includes an open and mechanically adequately loadable core structure with cover layers applied to one side or to both sides. The sandwich component is restrained between a pressure piston, an abutment and sidewalls of the press device, thus forming an essentially closed interior space. At least one of at least one cover layer and the core structure includes a curable duroplastic plastic material. A conveying device feeds heated air through the core structure of the sandwich component in a closed heated-air circuit or preferably in an open heated-air circuit in order to ensure energy-efficient curing of the sandwich component from the inside out. The heated air is temperature-controlled by a heater. In the case of an open heated-air circuit, heat recovery by a heat exchanger is provided.

16 Claims, 2 Drawing Sheets

(56) References Cited

U.S. PATENT DOCUMENTS

Figure 1:
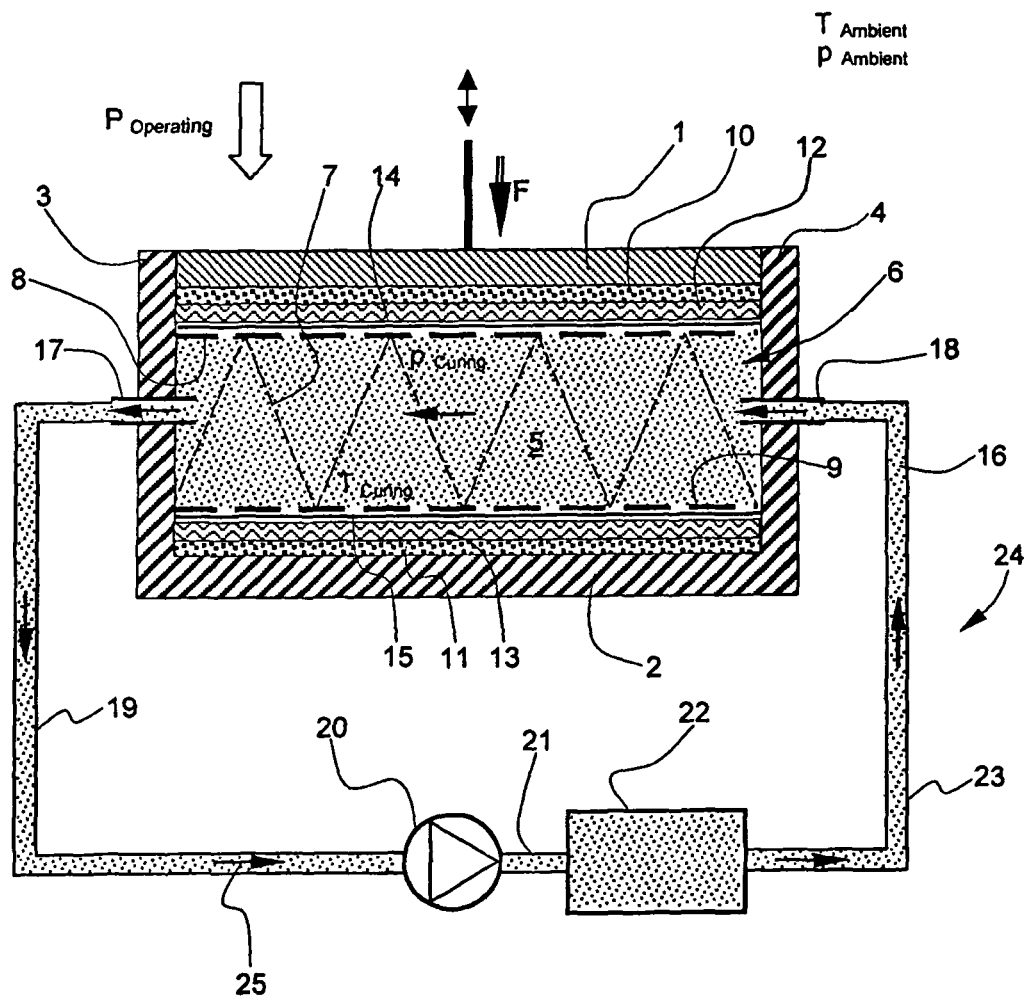

| | | | | |
|---|---|---|---|---|
| 3,338,999 A * | 8/1967 | Knapp | | 264/113 |
| 3,493,449 A * | 2/1970 | Krug | | 156/79 |
| 3,546,746 A * | 12/1970 | Johnson | | 425/98 |
| 3,784,152 A * | 1/1974 | Garner et al. | | 249/80 |
| 3,814,653 A | 6/1974 | Heier | | |
| 3,998,573 A * | 12/1976 | Gilbert et al. | | 425/117 |
| 4,024,089 A * | 5/1977 | Moilliet et al. | | 521/149 |
| 4,191,726 A * | 3/1980 | Stillhard et al. | | 264/517 |
| 4,234,536 A * | 11/1980 | Thiel et al. | | 264/522 |
| 4,360,329 A * | 11/1982 | Hatakeyama | | 425/112 |
| 4,456,448 A * | 6/1984 | Pippert | | 425/234 |
| 4,609,519 A * | 9/1986 | Pichard et al. | | 264/510 |
| 4,836,762 A * | 6/1989 | Davis, Jr. | | 425/89 |
| 5,043,034 A * | 8/1991 | Born | | 156/73.6 |
| 5,074,770 A * | 12/1991 | Graefe | | 425/117 |
| 5,271,879 A | 12/1993 | Saatchi et al. | | |
| 5,468,315 A * | 11/1995 | Okada et al. | | 156/64 |
| 5,788,995 A * | 8/1998 | Brams et al. | | 425/127 |
| 5,851,560 A * | 12/1998 | Kobayashi et al. | | 425/121 |
| 6,149,844 A * | 11/2000 | Graham | | 264/71 |
| 6,189,589 B1 * | 2/2001 | Tokunaga et al. | | 156/497 |
| 6,365,077 B1 * | 4/2002 | Pott et al. | | 264/113 |
| 6,387,489 B2 * | 5/2002 | Willemse et al. | | 428/359 |
| 6,413,069 B2 * | 7/2002 | Oono et al. | | 425/112 |
| 6,506,334 B1 * | 1/2003 | Ellison et al. | | 264/510 |
| 6,508,289 B2 * | 1/2003 | Hagai | | 156/443 |
| 6,565,346 B2 * | 5/2003 | Kanematsu et al. | | 425/130 |
| 6,648,621 B2 * | 11/2003 | Oono et al. | | 425/112 |
| 6,682,819 B2 * | 1/2004 | Damo | | 428/423.1 |
| 6,752,910 B2 * | 6/2004 | Sato et al. | | 162/396 |
| 6,872,346 B2 * | 3/2005 | Stillig | | 264/261 |
| 6,929,770 B2 * | 8/2005 | Caldwell, Jr. | | 264/510 |
| 2002/0047225 A1 | 4/2002 | Bruning et al. | | |
| 2002/0145221 A1 * | 10/2002 | Fireman et al. | | 264/132 |
| 2004/0041305 A1 * | 3/2004 | Tsuura et al. | | 264/335 |
| 2004/0108625 A1 * | 6/2004 | Moder et al. | | 264/510 |
| 2004/0113315 A1 * | 6/2004 | Graham | | 264/266 |
| 2007/0108655 A1 * | 5/2007 | Aramburu et al. | | 264/255 |
| 2008/0036107 A1 * | 2/2008 | Yeung et al. | | 264/40.1 |
| 2008/0203622 A1 * | 8/2008 | Graham | | 264/510 |
| 2009/0321009 A1 | 12/2009 | Hesse et al. | | |

FOREIGN PATENT DOCUMENTS

| | | |
|---|---|---|
| EP | 0 389 978 A2 | 10/1990 |
| JP | 55-28813 | 2/1980 |
| JP | 59194815 A | 11/1984 |
| JP | 04294136 A | 10/1992 |
| JP | 2002-316332 A | 10/2002 |
| JP | 2004209966 A | 2/2009 |
| JP | 2009505854 A | 2/2009 |
| SU | 48955 U1 | 1/1936 |

OTHER PUBLICATIONS

Database WPI Week 198015, Derwent Publications Ltd., London, GB: AN 1980-26328C XP002408101 & JP 55 028813 A (Kawanuishi Kogyo KK) Feb. 29, 1980.

* cited by examiner

PRESS DEVICE FOR THE ENERGY-EFFICIENT CURING OF A SANDWICH COMPONENT FOR AIRCRAFT

The invention relates to a press device for the energy-efficient curing of a sandwich component for an aircraft, comprising an open and mechanically adequately loadable core structure with cover layers applied to one side or to both sides, wherein the sandwich component is restrained between a pressure piston, an abutment and sidewalls of the press device, thus forming an essentially closed interior space, and at least one cover layer and/or the core structure comprise/comprises a curable duroplastic plastic material.

These days, sandwich components for passenger cabins of aircraft are, as a rule, made from phenolic resins. When compared to other curable resin systems, phenolic resins are associated with a significant advantage in that their behaviour in fire is favourable and meets even the stringent fire standards applying to passenger cabins of aircraft. Phenolic resins are cured in autoclaves at a pressure of approximately 3.5 bar and at a temperature of 100° C. to 180° C.

Panel-shaped, flat or spherically curved sandwich components, for example for interior lining components for passenger cabins of aircraft, are, for example, formed with a honeycomb-shaped core structure from aramide paper ("Nomex"® paper) and phenolic resin, which core structure comprises on both sides cover layers made from a so-called prepreg material made of phenolic resin. This prepreg material comprises reinforcement fibres, reinforcement mats or reinforcement scrim pre-impregnated with a phenolic resin. The sandwich component is cured in an autoclave at overpressure and at an elevated temperature. In this process an intensive connection of the cover layers to the core structure takes place so that very considerable mechanical strength values of the finished sandwich components result, because the cover layers are primarily exposed to tensile forces and pressure forces, while the core structure essentially fulfils the task of a spacer between the cover layers.

Curing in an autoclave requires a relatively great energy input for curing the sandwich components. Moreover, an autoclave is a heavy and at the same time massive device, which is important in particular in the case of large-format sandwich components.

It is an object of the invention to create a press device for curing sandwich components, which press device requires a lower energy input when compared to curing in an autoclave.

This object is met by a press device which comprises the following characteristic features of claim 1:
- a conveying device by which heated air can be fed through at least one inlet in a first sidewall of the press device at a defined curing pressure $p_{Curing}$ through the core structure of the sandwich component to at least one outlet in a second sidewall of the press device;
- a heater arranged outside the press device, by which heater the heated air is temperature-controllable so that in the region of the core structure a defined curing temperature $T_{Curing}$ results;
- two thermal insulating layers which at least in some regions are arranged on the pressure piston and the abutment; and
- two pressure sheet plates which at least in some regions are arranged on the thermal insulating layers.

Due to the heated air flowing through the core structure, the design, according to the invention, of the press device makes it possible to heat the sandwich component directly from the interior so that the press device, in particular when curing large-area sandwich components, can be operated at a comparatively low energy input, for example when compared to conventional curing in an autoclave.

One embodiment of the press device according to the invention provides for said press device to comprise a closed circuit, such that the at least one inlet and the at least one outlet are interconnected by way of a pipeline system including the conveying device and the heater. Due to the almost complete recirculation of the heated air in a closed circuit, this design makes it possible to operate the press device in an energy-efficient manner.

A further advantageous embodiment provides for the press device to comprise an open heated-air circuit, such that in the region of the at least one outlet a pressure controller is arranged that makes possible a controlled escape of the heated air into the surroundings or into a heat exchanger while maintaining an essentially constant curing pressure $p_{Curing}$, and provides for the conveying device to suck the heated air from the surroundings. This embodiment makes possible a technically less elaborate temperature control of the heated air, wherein, however, without heat recovery the energy input is significantly increased.

According to a further embodiment, by the heat exchanger the residual warmth of the heated air can be removed in the region of the at least one outlet, and this residual heat can be fed to the heated air that is sucked from the surroundings by the conveying device. This embodiment makes possible a more energy-efficient operation when compared to an open system without heat recovery by a heat exchanger.

A further embodiment provides for at least one sheet-type heating element to be arranged, at least in some regions, in each case between at least one pressure sheet plate and an insulating layer. In this way the cover layers can, if necessary, additionally be heated from the outside, for example in order to accelerate or further even out the curing process.

A further advantageous embodiment provides for the pressure piston and/or the abutment to comprise a surface geometry that differs from a plane shape.

In this way it becomes possible to produce sandwich components that comprise a surface geometry that is curved in two spacial dimensions at most. In this case, unlike the vertical arrangement shown in the drawing, additional sidewalls of the press device can be arranged so as to be inclined in relation to vertical, and/or can comprise a surface geometry that differs from the plane shape. In this variant the sidewalls should then be considered to be "part" of the pressure piston or of the abutment of the press device (two-part form). In this case the pressure piston constitutes the upper form half, while the abutment constitutes the lower form half. In order to prevent undercuts, in these constellations it may be necessary to carry out additional divisions in the region of the pressure piston and/or of the abutment.

However, if possible, in each of the constellations shown above in an exemplary manner, two opposing sidewalls should at least maintain their plane shape and vertical alignment so that, by the at least one inlet and outlet, the heated air can be fed without any problems through the core structure of the sandwich component.

Further advantageous embodiments of the invention are stated in the remaining subordinate claims.

Figure 2:
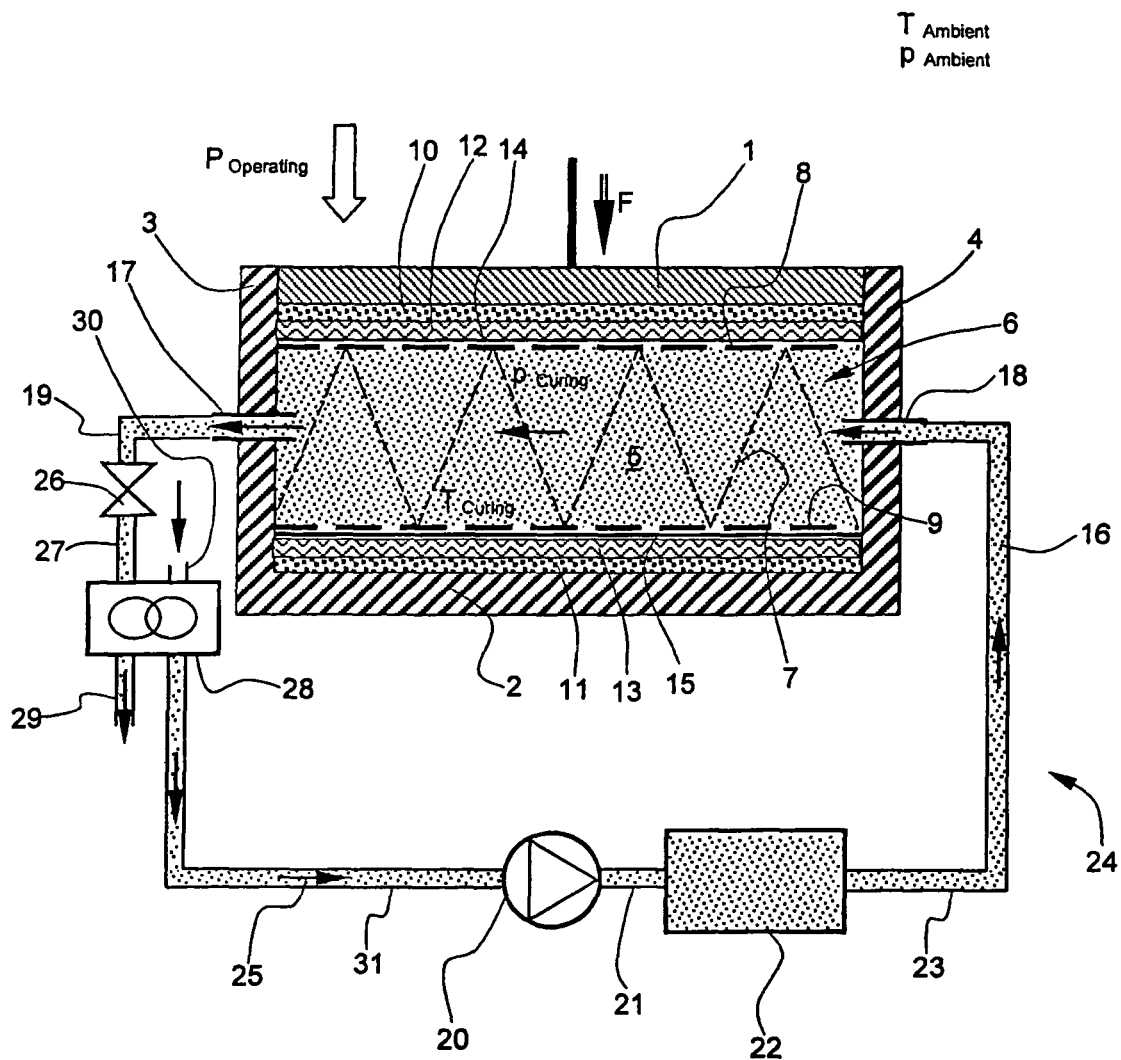

The drawing shows the following:

FIG. 1 a diagrammatic cross-sectional view of a first embodiment variant of the press device; and FIG. 2 a diagrammatic cross-sectional view of a second embodiment variant of the press device.

In the figures the same construction elements have the same reference character.

FIG. 1 shows a first embodiment variant with a closed circuit of the press device with a sandwich component situated therein. Among other things the press device comprises a pressure piston 1, an abutment 2 and a first and second sidewall 3, 4. On the front and on the rear of the press device further side surfaces (not visible in the drawing) have been provided. The pressure stamp 1, which can be moved up and down in vertical direction, is sealed off from all four sidewalls, and together with the abutment 2 forms a largely self-contained almost gas-proof interior space 5.

In the interior space 5 of the press device there is a sandwich component 6, which in the exemplary embodiment shown is panel-shaped.

The pressure piston 1 and the abutment 2 can have a curved cross-sectional geometry in order to produce sandwich components 6 with a correspondingly curved surface geometry. The surface curvature can be in up to two spatial directions. In this case, the first and the second sidewall 3, 4 together with the pressure piston 1 or the abutment 2 in the closed state (retracted state of the press device) constitute a form tool with a top and a bottom form half. In this embodiment variant, contrary to the situation in the schematic diagrams of FIGS. 1 and 2, the heated air 16 is fed vertically in relation to the drawing plane through the core structure 7 through the sidewalls that are not shown in FIG. 1. In order to prevent undercuts, a pressure piston 1 and/or an abutment 2 with a curved surface geometry may necessitate the provision of additional divisions.

The sandwich component 6 comprises a core structure 7 whose top and bottom are covered by a cover layer 8, 9. At least the cover layers 8, 9 are formed by a curable and if necessary fibre-reinforced duroplastic plastic material, in particular a phenolic resin, a melamine resin, a polyester resin, an epoxy resin or the like. The core structure 7 can, for example, comprise "Nomex®" paper or some other duroplastic and/or thermoplastic materials which, if necessary, comprise fibre reinforcement. As an alternative the core structure 7 can also comprise metal foils, metal foams, plastic foams, knob structures, perforated honeycombs or the like. It is imperative for the core structure 7 on the one hand to be adequately loadable from a mechanical point of view so that during the curing process in the press device it does not experience any deformation, and for the core structure 7 on the other hand to be open, i.e. able to drain, so as to make it possible for the heated air to flow through as far as possible without hindrance during the curing process. The core structure 7 can, for example, be designed as a known open folded honeycomb core structure or comprise slotted honeycombs. Alternative embodiments of the core structure 7, for example, perforated honeycombs, three-dimensional knitted fabrics made of thread-shaped elements or the like, are also imaginable, as long as they provide adequate mechanical loadability.

Furthermore, on the pressure piston 1 a thermal insulating layer 10 is arranged, preferably covering the entire area. Correspondingly the abutment 2 also comprises an insulating layer 11 that preferably covers the entire area. The thermal insulating layers 10, 11 are used to minimise the heat loss from the interior space 5 in the direction of the abutment 2 as well as in the direction of the pressure piston 1. On the thermal insulating layers 10, 11 the sheet-type heating elements 12, 13 are arranged, also preferably covering the entire area. The sheet-type heating elements 12, 13 can, for example, comprise electrically heatable heating foils, resistor foils or the like. To finish off, pressure sheet plates 14, 15 that preferably cover the entire area are arranged on the sheet-type heating elements 12, 13, in a manner that is known per se, in order to even out the effect of the force of the press device. As an alternative it is possible for the sheet-type heating elements 12, 13 not to be arranged between the pressure sheet plates 14, 15 and the thermal insulating layers 10, 11 or only in some areas between said pressure sheet plates 14, 15 and the thermal insulating layers 10, 11. The sheet type heating elements 12, 13 are used, if necessary, to increase the heating performance should heating of the core structure 7 solely by heated air 16 not be adequate.

In the first sidewall 3 there is an outlet 17, and in the second sidewall 4 an inlet 18 is arranged. Instead of the single inlet 18 and the single outlet 17 a multitude of through-openings, nozzles, distributors, elbows or the like can be arranged in the sidewalls 3, 4 in order to achieve as even a flow through the core structure 7 as possible with little flow resistance. The outlet 17 is connected to the conveying device 20 by a pipeline 19. The conveying device 20 can, for example, be a compressor, a blower, a fan or the like. Emanating from the conveying device 20 the heated air 16 reaches the heater 22 by way of a further pipeline 21. To heat the through-flowing heated air 16 the heater 22 for temperature-controlling the heated air 16 can, for example, comprise electrical heater spirals or the like. In addition the heater 22 may also comprise a cooling device for the defined cooling of the heated air 16. Emanating from the heater 22 the temperature-controlled heated air 16 is conveyed back to the inlet 18 by way of a further pipeline 23. The pipelines 19, 21 and 23 together form the pipeline system 24 of the press device. In this arrangement, by the conveying device 20, the heated air 16 is circulated in a closed circuit always in the direction of the black direction arrows, of which for the sake of clarity only one direction arrow 25 has a reference character.

In the press device diagrammatically shown in FIG. 1, the heated air 16 is continuously circulated through the core structure 7 so that energy-efficient operation results. The pressure piston 1 is pressed at a defined force F against the abutment 2 and onto the sandwich component 6 in order to generate a defined operating pressure $p_{Operating}$. Generating the force F and thus the operating pressure $p_{Operating}$ in the interior space 5 can, for example, take place in the known way by electro-hydraulic drive systems (hydraulic pistons) or electromechanical drive systems (spindle drives) that in turn are controlled by a control- and regulating device (not shown in detail). Preferably, generating the force F takes place by several hydraulics cylinders that are controlled by a control and regulating device (not shown in detail).

In the interior space 5 of the press device there is a curing pressure $p_{Curing}$, that matches, among other things, the operating pressure $p_{Operating}$ at an also determined curing temperature $T_{Curing}$. The operating pressure $p_{Operating}$ can be varied by the force F, while the curing pressure $p_{Curing}$ is essentially controllable by the conveying device 20, while the curing temperature $T_{Curing}$ is essentially controllable by the heater 22. Both the conveying device 20 and the heater 22 are controlled by the control- and regulating device. In controlling the conveying device 20 and the heater 22, in particular the interdependence of pressure and temperature of the heated air 16 is taken into account in order to ensure a curing temperature $T_{Curing}$ that is defined as precisely as possible at a pre-selected curing pressure $p_{Curing}$.

In the first embodiment variant, as shown, of the press device with the completely closed heated-air circuit, it is furthermore possible to periodically reverse the direction of flow of the heated air 16 in order to achieve more even temperature control of the interior space 5 and thus of the core structure 7 of the sandwich component 6.

FIG. 2 illustrates the basic design of the press device in a second embodiment variant comprising an open heated-air circuit. The press device according to the second embodiment variant again comprises the pressure piston 1, the abutment 2 as well as the two sidewalls 3, 4 to form the hermetically sealed interior space 5. In the interior space 5 of the press device the sandwich component 6 that is formed with the cover layers 8, 9 as well as with the core structure 7 is arranged. Analogous to the first embodiment variant of the press device, both the pressure piston 1 and the abutment 2 also comprise the thermal insulating layers 10, 11, the sheet-type heating elements 12, 13 as well as the pressure sheet plates 14, 15, preferably in a design covering the entire area.

In the first and second sidewalls 3, 4, again, the inlets and outlets 17, 18 for feeding the heated gas 16 through the sandwich component 6 are arranged. Outside the press device there is the normal ambient temperature $T_{Ambient}$ of, for example, 21° C. and the ambient air pressure $p_{Ambient}$ of, for example, 1013 hPa. The pressure piston 1 is pressed by a hydraulic system (not shown in detail) at a force F onto the sandwich component 6 and thus the abutment 2 in order to generate the required operating pressure $p_{Operating}$ outside the sandwich component 6.

The outlet 17 is connected to a pressure controller 26 by way of the pipeline 19, with a pipeline 27 leading from said pressure controller 26 to a heat exchanger 28. The pressure controller 26 ensures that the heated air 16 leaves the outlet 17 in the direction of the heat exchanger 28 at a defined volume flow, thus preventing major pressure fluctuations of the curing pressure $p_{Curing}$ in the interior space 5 of the press device. In an ideal case, by the pressure controller 26, the curing pressure $p_{Curing}$ can be kept almost constant over the entire duration of curing the sandwich component 6. The pressure controller 26 is preferably designed so as to be controllable by the control- and regulating device, for example in order to achieve a variable volume flow of the emanating heated air 16. For example a continuously controllable solenoid valve (electrically selectable proportional valve or servo valve) or a conventional pressure reducer can be used as a pressure controller 26.

After flowing through the heat exchanger 28, the heated air 16 cooled in the heat exchanger 28 is fed to the outside by way of a further pipeline 29. By way of a pipeline 30 the outside air, which at first is cooler, reaches the heat exchanger 28, where by the heat that has previously been taken from the outflowing air from the interior space 5 it is at least preheated, sucked in by the conveying device 20 by way of a further pipeline 31, and in the heating device 22 brought to a curing temperature $T_{Curing}$ that is optimal for the resin system used in the given sandwich component 6, at a corresponding curing pressure $p_{Curing}$.

Irrespective of the heated-air system that is open in the second embodiment variant of the press device, the heat exchanger 28 makes it possible to achieve energy-efficient operation because a maximum of heat energy is taken from the heated air that is fed from the outlet 17 by way of the pressure regulator 26 to the surroundings, with said heat energy being fed to the initially still cooler heated air 16 sucked in from the surroundings, in order to preheat said heated air. After the temperature-controlled heated air 16 has passed the heater 22 it reaches the inlet 18, by way of the pipeline 23, and thereafter the core structure 7 of the sandwich component 6.

In order to cure the sandwich component 6 the pressure stamp 1 is extended until it pushes onto the sandwich component 6 with a force F and in the interior space 5 there is an operating pressure $p_{Operating}$. In this process the operating pressure $p_{Operating}$ is limited to a maximum of 15 bar in order to prevent mechanical damage to the sandwich component 6, in particular to the core structure 7.

For example in the case of a sandwich component 6 comprising polycondensation resins, the curing temperature $T_{Curing}$ in the interior space 5 should preferably be 135° C., with said curing temperature being kept essentially constant by the heater 22. During the entire duration of the curing process, in an advantageous manner by matching the curing pressure $p_{Curing}$, by the conveying device 20 it can be ensured that the value of the curing pressure $p_{Curing}$ in the region of the core structure 7 of the sandwich component 6 is always such that during curing of the polycondensation resin at the temperature $T_{Curing}$ that exists at the time, if at all possible, no water changes to the steam phase in the interior space 5. At a curing temperature $T_{Curing}$ of approximately 135° C., which in this application case of the press device is an optimal temperature, for example a curing pressure $p_{Curing}$ of more than 3.128 bar must be maintained. The duration of curing the sandwich component 6 is, as a rule, up to 2 hours at a curing pressure $p_{Curing}$ of more than 3.128 bar and a curing temperature of approximately 135° C.

The above-described process control of the press device, which to the full extent is fully-automatically controlled by the control- and regulating device, is advantageous in all sandwich components with a drainable core structure, in which at least one cover layer and/or at least the core structure comprises a polycondensation resin system, for example in the form of a phenolic resin, a melamine resin or the like, for suppressing steam formation and the associated negative concomitant phenomena, in particular in the form of blister- and bubble formation in the resin matrix.

Sandwich components whose cover layers and/or core structures comprise other curable duroplastic plastic materials, in particular epoxy resin, polyester resin, bismaleimid resin or the like, can also be fully-automatically cured in the press device in a particularly energy-efficient manner, with adaptation to the curing parameters ($T_{Curing}$, $p_{Curing}$) required for the respective resin systems.

In principle with the use of the press device it is also possible to produce sandwich components in which at least one cover layer comprises a thermoplastic plastic material. In this case the thermoplastic cover layers are melted on, at least in some regions, by the correspondingly temperature-controlled heated air, for mechanical connection to the core structure. In this arrangement the curing temperature $T_{Curing}$ in the interior space is in the region of the melting temperature of the thermoplastic plastic material used to form the cover layers.

Instead of using conventional air, the press device according to the first embodiment variant with the closed heated-air circuit can also be operated with other gases, preferably inert gases, as heating gases, for example with nitrogen, helium, neon, argon, krypton, xenon or the like.

LIST OF REFERENCE CHARACTERS

1 Pressure stamp
2 Abutment
3 First sidewall
4 Second sidewall
5 Interior space
6 Sandwich component
7 Core structure
8 Cover layer
9 Cover layer
10 Thermal insulating layer
11 Thermal insulating layer
12 Sheet-type heating element 13 Sheet-type heating element
14 Pressure sheet plate
15 Pressure sheet plate
16 Heated air
17 Outlet
18 Inlet
19 Pipeline
20 Conveying device
21 Pipeline
22 Heater
23 Pipeline
24 Pipeline system
25 Direction arrow
26 Pressure regulator
27 Pipeline
28 Heat exchanger
29 Pipeline
30 Pipeline
31 Pipeline

The invention claimed is:

1. A press device for an energy-efficient curing of a sandwich component for an aircraft, the sandwich component having an open core structure with cover layers applied to one side or to both sides, the sandwich component being clamped between a pressure piston, an abutment and sidewalls of the press device, thus forming a substantially closed interior space, and at least one of at least one cover layer and the core structure comprises a curable duroplastic plastic material, the press device comprising:
a conveying device feeding heated air through at least one inlet in a first sidewall of the press device, the heated air being fed at a defined curing pressure $p_{Curing}$, the pressure at least partially controlled by the conveying device, through the core structure of the sandwich component to at least one outlet in a second sidewall of the press device;
a heater arranged outside of the press device, the heater providing the heated air so that in a region of the core structure, a defined curing temperature $T_{Curing}$ results;
first and second thermal insulating layers at least in some regions arranged on the pressure piston and the abutment; and
first and second pressure sheet plates at least in some regions arranged on the thermal insulating layers;
wherein the press device is configured so that for a given curing temperature $T_{curing}$, the defined curing pressure $p_{curing}$ is set such that steam formation in the closed interior space is suppressed during a curing process.

2. The press device of claim 1, further comprising:
a closed heated-air circuit, such that the at least one inlet and the at least one outlet are interconnected by way of a pipeline system including the conveying device and the heater.

3. The press device of claim 1, further comprising:
an open heated-air circuit, such that in a region of the at least one outlet a pressure controller is arranged that makes possible a controlled escape of the heated air into surroundings or into a heat exchanger while maintaining a substantially constant curing pressure $p_{Curing}$, and provides for the conveying device to suck the heated air from the surroundings.

4. The press device of claim 3, wherein the heat exchanger is in a region of the at least one outlet, and a residual warmth of the heated air is removable by the heat exchanger, wherein the residual heat is configured to be fed to the heated air sucked from surroundings by the conveying device.

5. The press device of claim 1, wherein at least one sheet-type heating element is arranged, at least in some regions, in each case between at least one pressure sheet plate and one of the first and second thermal insulating layers.

6. The press device of claim 1, wherein a surface geometry of at least one of the pressure piston and the abutment differs from a plane surface geometry.

7. The press device of claim 1, wherein the pressure piston is pressable at a defined force F against the abutment in order to generate a defined operating pressure $p_{Operating}$ so as to compensate for the curing pressure p $p_{Curing}$ that exists in the core structure.

8. The press device of claim 1, wherein the curing pressure $p_{Curing}$ and the curing temperature $T_{Curing}$ are set by a controlling- and regulating device depending on the duroplastic plastic material used for at least one of the at least one cover layer and the core structure of the sandwich component.

9. The press device of claim 1, wherein a curing of the sandwich component, having at least one cover layer comprising a polycondensation resin, takes place at a curing pressure $p_{Curing}$ that is between an ambient air pressure $p_{Ambient}$ and an operating pressure $p_{Operating}$ of the press device, to at least in part suppress steam formation during the curing process.

10. The press device of claim 9, wherein the curing of the sandwich component takes place at a curing temperature $T_{Curing}$ of between 100 C and 180 C.

11. The press device of claim 9, wherein, for the purpose of curing, the sandwich component is subjected to a curing temperature $T_{Curing}$ of approximately 135° C. and to a curing pressure $p_{Curing}$ of more than 3.128 bar.

12. The press device of claim 9, wherein the press device generates an operating pressure $p_{Operating}$ of a maximum of 15 bar.

13. The press device of claim 1, further comprising a pressure controller and a heat exchanger provided between the at least one outlet of the press device and the conveying device, the pressure controller ensuring that the heated air leaves the outlet in a direction of the heat exchanger at a defined volume flow.

14. The press device of claim 13, wherein the pressure controller is a continuously controlled solenoid valve.

15. The press device of claim 1, wherein when the pressure piston is moved into the substantially closed interior space to create an operating pressure $p_{Operating}$ within the substantially closed interior space, wherein the conveying device adjusts $p_{Curing}$ to match $p_{Operating}$.

16. The press device of claim 1, wherein for a given curing temperature $T_{curing}$, the defined curing pressure $p_{curing}$ is set such that no water changes to steam phase in the closed interior space.

* * * * *

UNITED STATES PATENT AND TRADEMARK OFFICE
CERTIFICATE OF CORRECTION

PATENT NO. : 8,740,606 B2
APPLICATION NO. : 11/990899
DATED : June 3, 2014
INVENTOR(S) : Busch et al.

Page 1 of 1

It is certified that error appears in the above-identified patent and that said Letters Patent is hereby corrected as shown below:

In the claims

Column 8, line 18, claim 7 after "pressure" delete "p" (first occurrence).

Signed and Sealed this
Twenty-sixth Day of January, 2016

Michelle K. Lee
*Director of the United States Patent and Trademark Office*